United States Patent
Sompura (10) Patent No.: US 10,692,237 B2
(45) Date of Patent: Jun. 23, 2020

(54) RING SIZE MEASUREMENT SYSTEM AND METHOD FOR DIGITALLY MEASURING RING SIZE

(71) Applicant: Mehul Sompura, New York, NY (US)

(72) Inventor: Mehul Sompura, New York, NY (US)

(*) Notice: Subject to any disclaimer, the term of this patent is extended or adjusted under 35 U.S.C. 154(b) by 0 days.

(21) Appl. No.: 16/030,187

(22) Filed: Jul. 9, 2018

(65) Prior Publication Data

US 2020/0013182 A1    Jan. 9, 2020

(51) Int. Cl.
*G06T 7/62* (2017.01)
*G01B 11/08* (2006.01)
*H04N 5/272* (2006.01)

(52) U.S. Cl.
CPC ............... *G06T 7/62* (2017.01); *G01B 11/08* (2013.01); *H04N 5/272* (2013.01); *H04N 2005/2726* (2013.01)

(58) Field of Classification Search
CPC ............ G06T 7/62; G01B 11/08; H04N 5/272
USPC ........................................................... 348/77
See application file for complete search history.

(56) References Cited

U.S. PATENT DOCUMENTS

| | | | |
|---|---|---|---|
| 7,578,070 B1* | 8/2009 | Lynch | G01B 3/34 33/514.1 |
| 2013/0261524 A1* | 10/2013 | Barnes | A61F 5/013 602/22 |
| 2014/0036052 A1* | 2/2014 | Lam | G01B 11/08 348/77 |
| 2016/0130889 A1* | 5/2016 | Torrione | G06T 7/0004 348/135 |
| 2016/0286910 A1* | 10/2016 | Fisher | B26B 27/007 |
| 2018/0081439 A1* | 3/2018 | Daniels | G06F 1/163 |
| 2018/0240354 A1* | 8/2018 | Carrick | G09B 15/06 |

* cited by examiner

*Primary Examiner* — Nguyen T Truong
(74) *Attorney, Agent, or Firm* — Law Office of Jerry Joseph, PLC; Jerry Joseph

(57) ABSTRACT

A ring size measuring system to digitally measure a ring size of a user's finger including an image capturing device configured to capture a digital image of the user's finger, one or more processors, memory, and one or more programs, wherein the one or more programs are stored in the memory and configured to be executed by the one or more processors, the one or more programs including instructions for: receiving a digital image of a user's hand using the image capturing device, determining a distance between the image capturing device and the user's hand, and defining at least one-dimension point pair of a selected finger from the received digital image, wherein the one or more processors calculate a distance between the dimension point pair to calculate a diameter of the selected finger.

13 Claims, 9 Drawing Sheets

RING SIZE MEASUREMENT SYSTEM AND METHOD FOR DIGITALLY MEASURING RING SIZE

BACKGROUND OF THE INVENTION

1. Field of the Invention

The present general inventive concept relates to a system and method for determining ring sizes of users using an image, and more particularly, to a ring size measurement system and method for determining ring sizes digitally using an electronic device having an image capturing device to capture a digital image.

2. Background of the Invention

Each year, millions of consumers purchase various types of jewelry and accessories, such as rings. However, many consumers are often unaware of their current ring sizes and are required to spend a considerable amount of time trying on various sizes of rings in order to determine their actual size. In addition, when purchasing rings for other people, consumers are faced with a difficult challenge in approximating the intended recipients ring size.

Typically, the jewelry industry measures a user's ring size by placing various sized measurement rings on the user's finger, one by one. However, this method is time consuming and often inaccurate due to various reasons, such as friction and improperly placing the measurement ring on the user's finger.

Therefore, what is needed is a ring size measurement system and method that can conveniently and accurately measure a user's ring size digitally, without the need of physical measurements.

BRIEF SUMMARY OF THE INVENTION

The present general inventive concept relates to an image processing system configured to receive digital still images or moving images depicting various orientations of a user's hand in order to calculate a ring size of a particular finger.

Features and/or utilities of the present general inventive concept may be achieved by providing a ring size measuring system configured to digitally measure a ring size of a user's finger, the system includes an image capturing device configured to capture a digital image of the user's finger, one or more processors, memory, and one or more programs, wherein the one or more programs are stored in the memory and configured to be executed by the one or more processors, the one or more programs including instructions for: receiving a digital image of a user's hand using the image capturing device, determining a distance between the image capturing device and the user's hand, and defining at least one-dimension point pair of a selected finger from the received digital image, wherein the one or more processors calculate a distance between the dimension point pair to calculate a diameter of the selected finger.

The one or more programs may further include displaying a ring size corresponding to the calculated diameter using a data set including a diameter to ring size conversion chart of the selected finger on a display screen.

The ring size measuring system may further include the one or more processors calculating a circumference of the selected finger based on the calculated diameter.

The one or more programs may further include displaying a ring size corresponding to the calculated circumference using a data set including a circumference to ring size conversion chart of the selected finger on a display screen.

The digital image may include a first orientation and a different second orientation of the user's hand.

The calculating of the circumference may include the one or more processors using a formula $C=(Pi)*d$, wherein C represents circumference, Pi equals 3.14159, and d represents the diameter of the selected finger.

The digital image may be a moving image of a complete rotation of the user's finger.

The ring size measuring system may further include an augmented reality system using the image of the user's hand captured using the image capturing device to determine a ring size of a selected finger.

The ring size measuring system may further include a virtual reality system using the image of the user's hand captured using the image capturing device to determine a ring size of a selected finger.

Features and/or utilities of the present general inventive concept may also be achieved by providing a computer-implemented method for measuring a ring size of a user's finger, the method includes capturing image data comprising a plurality of views of a user's hand having at least two or more different orientations, calibrating measurement information by positioning the user's hand within an overlayed image, defining at least one-dimension point pair of a desired finger from the captured image data, calculating a diameter based on a distance between the defined dimension points, and determining a ring size of the desired finger based on the calculated diameter using a data set.

The dimension point pair may be defined at outermost edges of the desired finger.

The method may further include calculating a circumference of the desired finger using the dimension point pair captured from the two or more different orientations of the digital image.

The data set may include circumference data and corresponding ring size data.

The data set may include diameter data and corresponding ring size data.

Features and/or utilities of the present general inventive concept may also be achieved by providing a ring size measuring system configured to digitally measure a ring size of a user's finger, without requiring any physical measurements of the user's finger which includes an image capturing device, one or more processors, memory, and one or more programs, wherein the one or more programs are stored in the memory and configured to be executed by the one or more processors, the one or more programs including instructions for: capturing image data comprising a plurality of views of a user's hand having at least two or more different orientations, calibrating measurement information by positioning the user's hand within an overlayed image, defining at least one-dimension point pair of a desired finger from the captured image data, calculating a diameter based on a distance between the defined dimension points; and determining a ring size of the desired finger based on the calculated diameter using a data set.

Additional aspects of the present general inventive concept will be set forth in part in the description which follows and, in part, will be obvious from the description, or may be learned by practice of the general inventive concept.

BRIEF DESCRIPTIONS OF THE DRAWINGS

These and/or other aspects of the present general inventive concept will become apparent and more readily appreciated from the following description of the embodiments, taken in conjunction with the accompanying drawings of which.

DETAILED DESCRIPTION

Reference will now be made in detail to the exemplary embodiments of the present general inventive concept, examples of which are illustrated in the accompanying drawings, wherein like reference numerals refer to the like elements throughout. The exemplary embodiments are described below in order to explain the present general inventive concept by referring to the figures.

The present general inventive concept provides a measuring system and method for determining accessories sizes, including ring sizes, using a still image and/or a moving image.

The present general inventive concept also provides a measuring system and method for determining accessories sizes, including ring sizes, using a still image and/or a moving image and virtual and/or augmented reality.

The present general inventive concept relates to a system and method for determining a ring size of a user using an electronic device to capture a still and/or moving image of the users hand from a plurality of orientations with respect to the image capturing device. The system and method do not require physical measurements of the users hand to output a ring size. Instead, the system and method according to the present general inventive concept, accesses position information of the image capturing device from the user's hand, pixel information from within the captured image of the users hand, and an external database to determine and output a ring size of the user.

Figure 1:
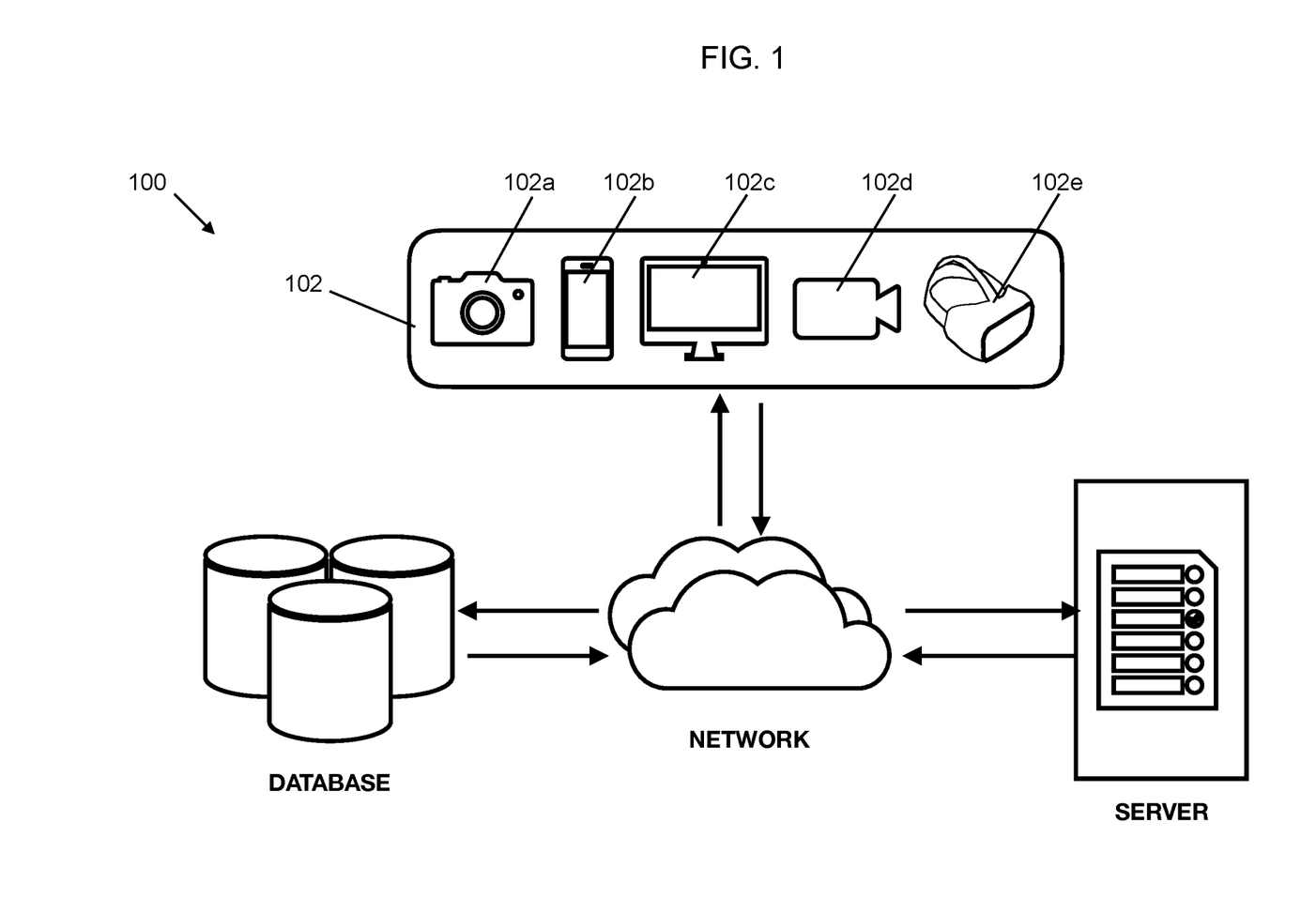
FIG. 1 illustrates an exemplary embodiment of a ring size measuring system configured to digitally measure a ring size of a user's finger according to the present general inventive concept.
Figure 2:
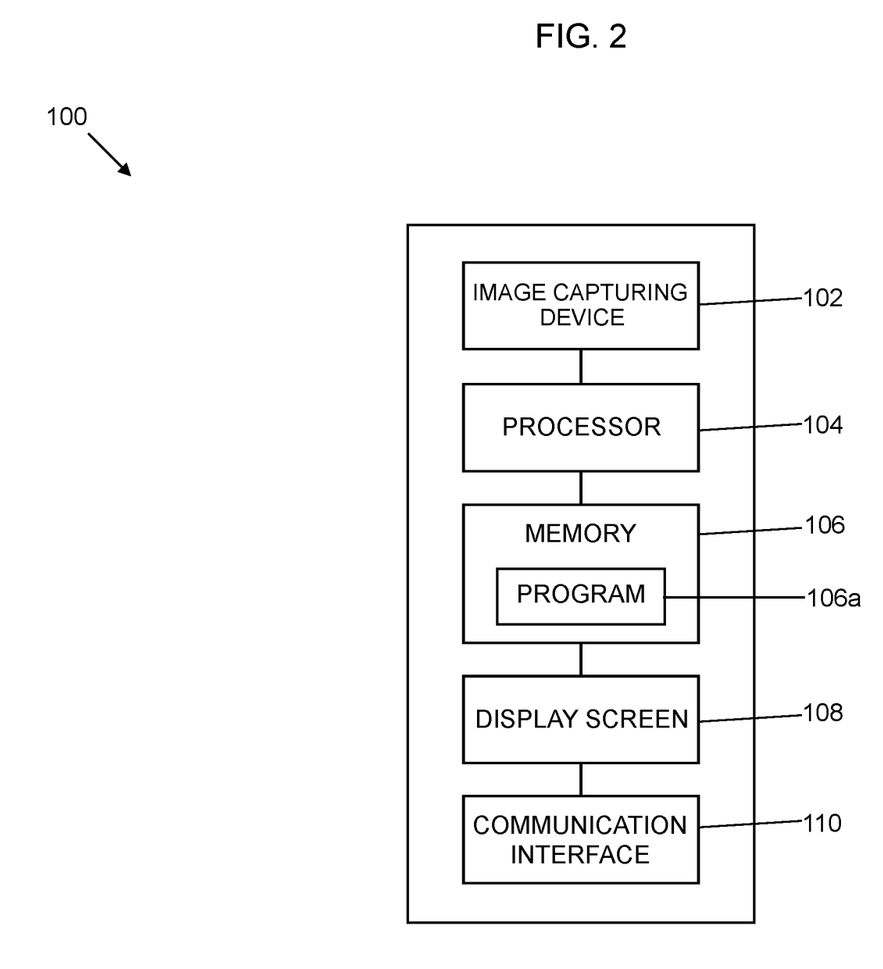
FIG. 2 illustrates exemplary embodiments of image capturing devices utilized within the ring size measurement system illustrated in FIG. 1.

FIG. 1 illustrates an exemplary embodiment of a ring size measuring system 100 configured to digitally measure a ring size of a user's finger according to the present general inventive concept. FIG. 2 illustrates exemplary embodiments of image capturing devices 102 utilized within the ring size measurement system illustrated in FIG. 1.

Referring to FIG. 1, in an exemplary embodiment, a ring size measuring system 100 configured to digitally measure a ring size of a user's finger 12 using a digital still and/or moving image of the user's hand includes an image capturing device 102, a processor 104, a memory 106 to store a program or instructions, a display screen 108, and a communication interface 110 to communicate to an external database and/or server through a network. In the present embodiment, the processor 104 is configured to calculate a ring size of a selected user's finger from a digital still and/or moving image of the user's hand captured by the image capturing device 102. However, the present general inventive concept is not limited thereto.

In the present embodiment, the measuring system 100 includes a portable computing device 110 integrated with or coupled to an image capturing device 102, processor 104, memory 106, display screen 108, and communication interface 110. A user operates a portable computing device 110 having the image capturing device 102, such as a digital camera 102a, smartphone 102b, tablet 102c, security camera 102d, augmented reality visor 102e or the like, to measure physical dimensions, such as ring size of the users hand 10. However, the present general inventive is not limited thereto. That is, in alternative embodiments, the measuring system 100 may be used to measure the users watch and necklace size.

In the present embodiment, the ring size measuring system 100 is designed and/or configured to digitally measure a ring size of a user's finger using only a digital still or moving image of the users hand. The one or more programs including instructions for the processor 104 to receive a digital image of a user's hand 10a using the image capturing device 102, determine a distance between the image capturing device 102 and the user's hand 10 and define at least one-dimension point pair of a selected finger within the received digital image of the users hand. The one or more processors 104 calculate a distance between the dimension point pair to calculate a diameter of the selected finger. The calculated diameter is then used to determine a corresponding ring size within a data set stored within the memory 106 or external database. However, the present general inventive concept is not limited thereto.

Figure 7:
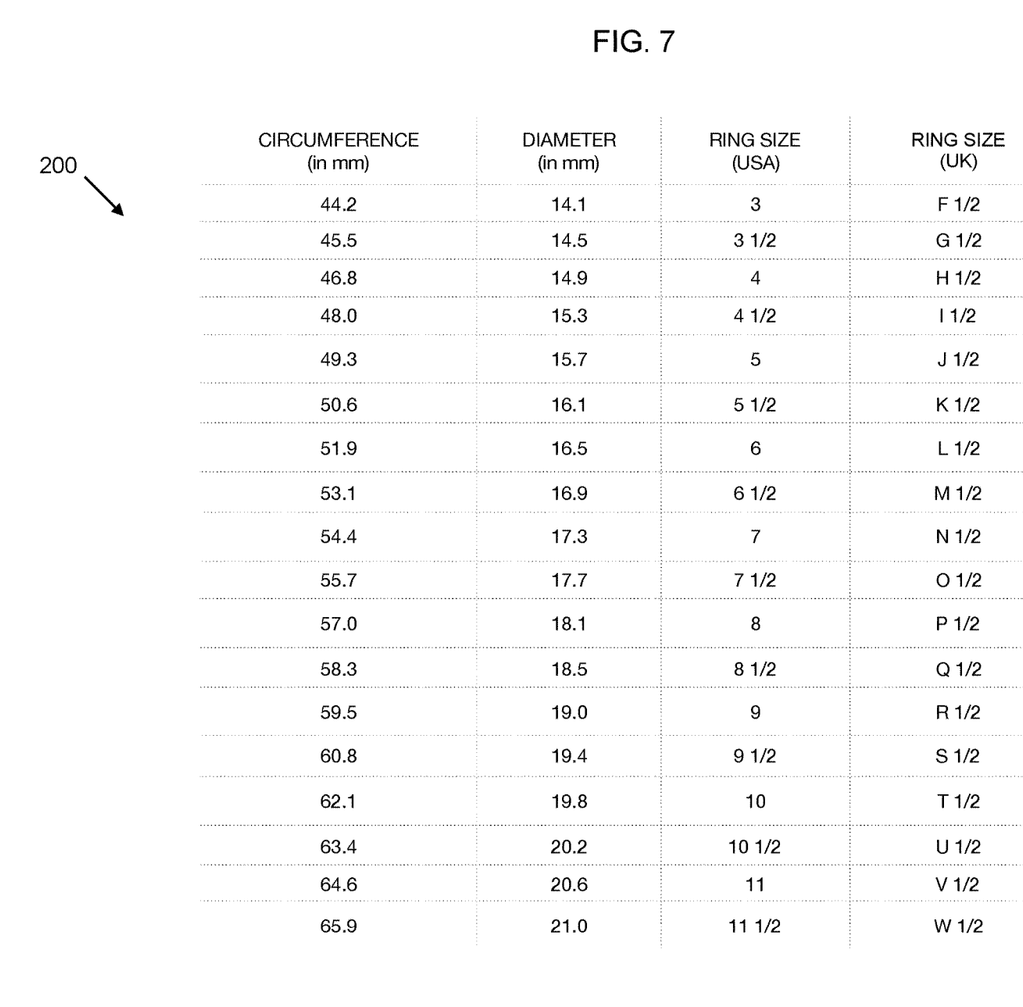
FIG. 7 illustrates a data set including a diameter and circumference to ring size conversion chart.

In the present embodiment, the processor 104 executes instructions stored within the memory 106 to define dimension point pairs to locate outermost edges of each of the user's fingers and wrist. These points are determined based on a difference in pixels (e.g., difference in color, contrast, brightness or the like) of the users hand and a background. However, the present general inventive concept is not limited thereto. That is, in alternative exemplary embodiments, the processor 104 determines and/or locates the user's knuckles to determine a largest width of each finger. Once the processor 104 identifies the dimension point pairs for each finger, the processor 104 determines a digital length between the points in order to calculate a diameter or width of the user's finger. Next, the system 100 determines a ring size based on comparison of a data set stored within the memory 106 or external database. The data set 200 provides a conversion chart between finger diameter and ring size, as well as finger circumference and ring size. Next, the system 100 displays the users hand with the determined ring size superimposed over the image on the display screen 108.

In alternative exemplary embodiments, the system 100 may further include an augmented reality display of the ring size and the users hand displayed on the display screen 108.

Figure 3A:
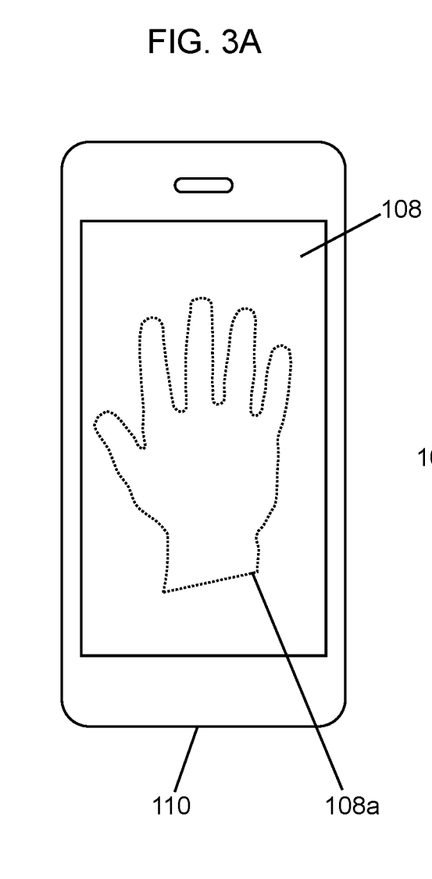
FIGS. 3A-3C illustrates an example embodiment of a method of calibrating measurement and distance information using the ring size measuring system according to the present general inventive concept.
Figure 3B:
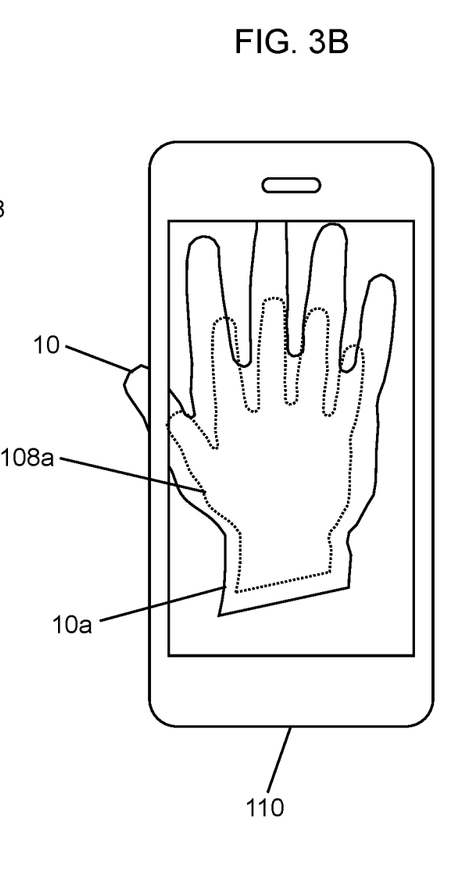
Figure 3C:
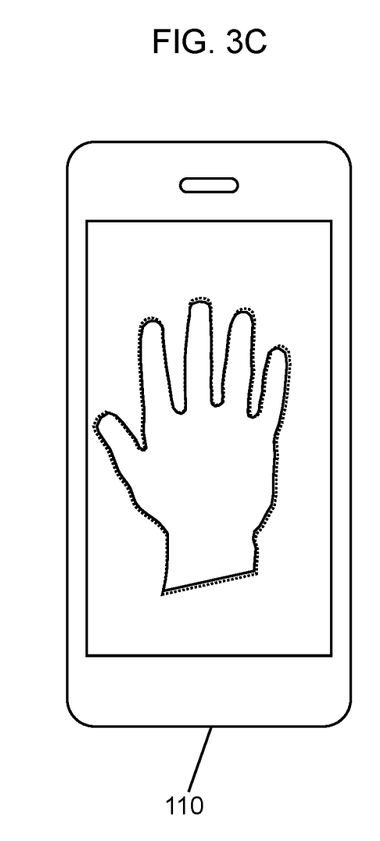

FIGS. 3A-3C illustrates an example embodiment of a method of calibrating measurement and distance information using the ring size measuring system 100 according to the present general inventive concept.

In exemplary embodiments, the measuring system 100 for determining ring sizes of a user includes an electronic device 110 which is used to capture a still and/or moving image of the users hand 10. In order to determine a distance between the users hand 10 and the electronic device 110, the system 100 displays a hand outline 108a on the display screen 108. The user then adjusts a position of his/her hand 10, relative to the electronic device 110, such that an image of the users hand 10a falls within the displayed hand outline 108a. The user then captures a still and/or moving image of his/her hand 10.

The user may then rotates his/her hand to capture all orientations including the front, back, perspective, and side view using an image capturing device 102 coupled to or in communication with the measuring system 100. As such, users may measure their fingers and/or wrists by only using their electronic device 110, without the need of conventional measuring tools to physically measure their hand. Further, users may be able to capture and send an image of their hand or a different users hand to measure a ring size of that user.

In the present exemplary embodiment, the device 100 may be moved around the users hand 10 to capture a plurality of dimension point pairs 120 of the users hand 10. For instance, the device 100 may be used to capture dimension point pairs 120 to determine a ring size for a particular user's finger.

Figure 4A:
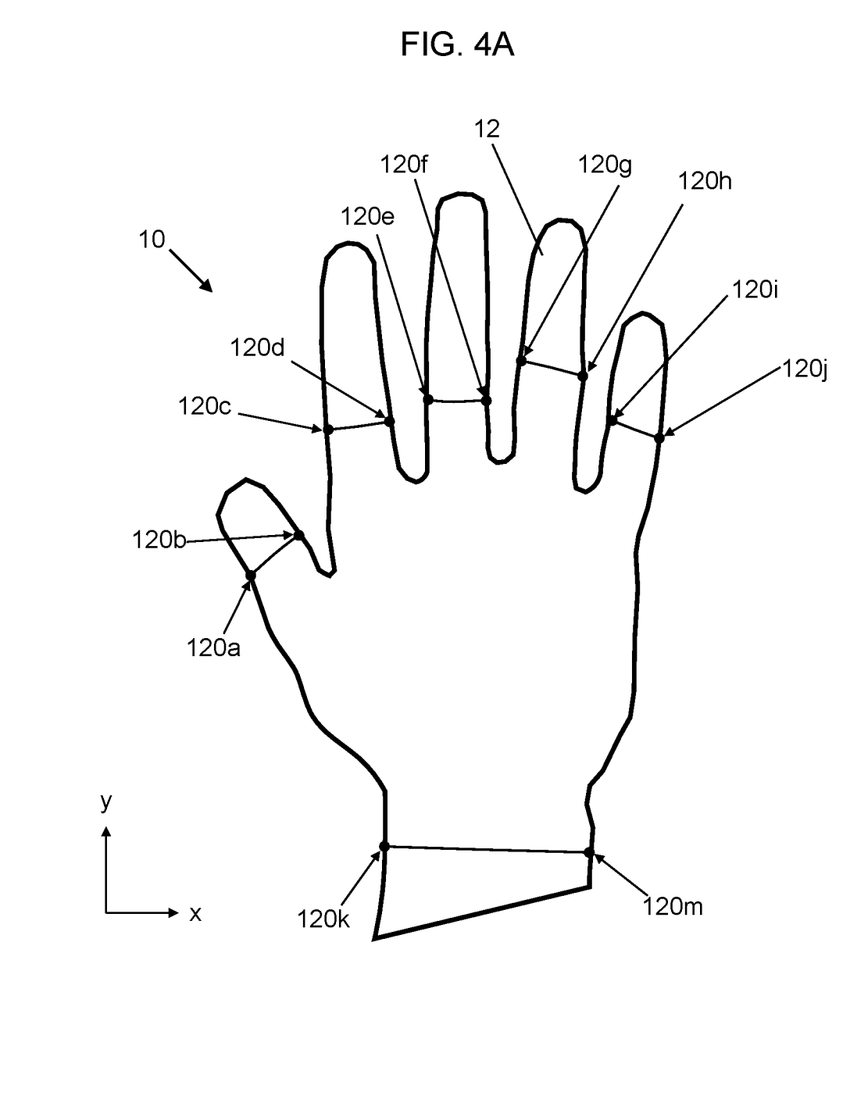
FIG. 4A illustrates a schematic front view of a users hand indicating dimension point pairs.
Figure 4B:
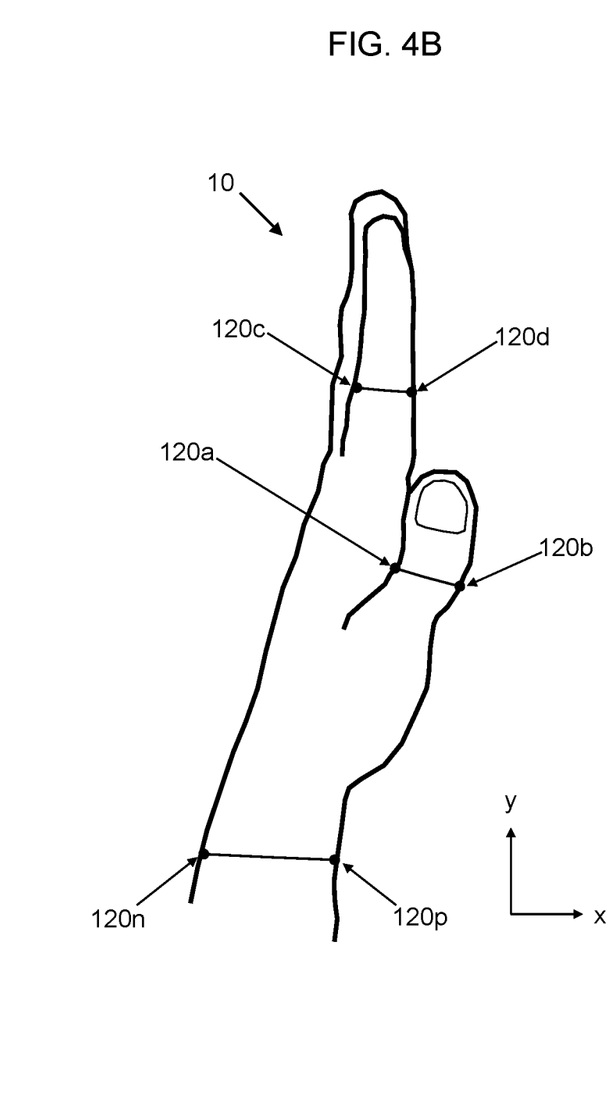
FIG. 4B illustrates a schematic side view of the users hand illustrated in FIG. 4A indicating dimension point pairs.
Figure 5:
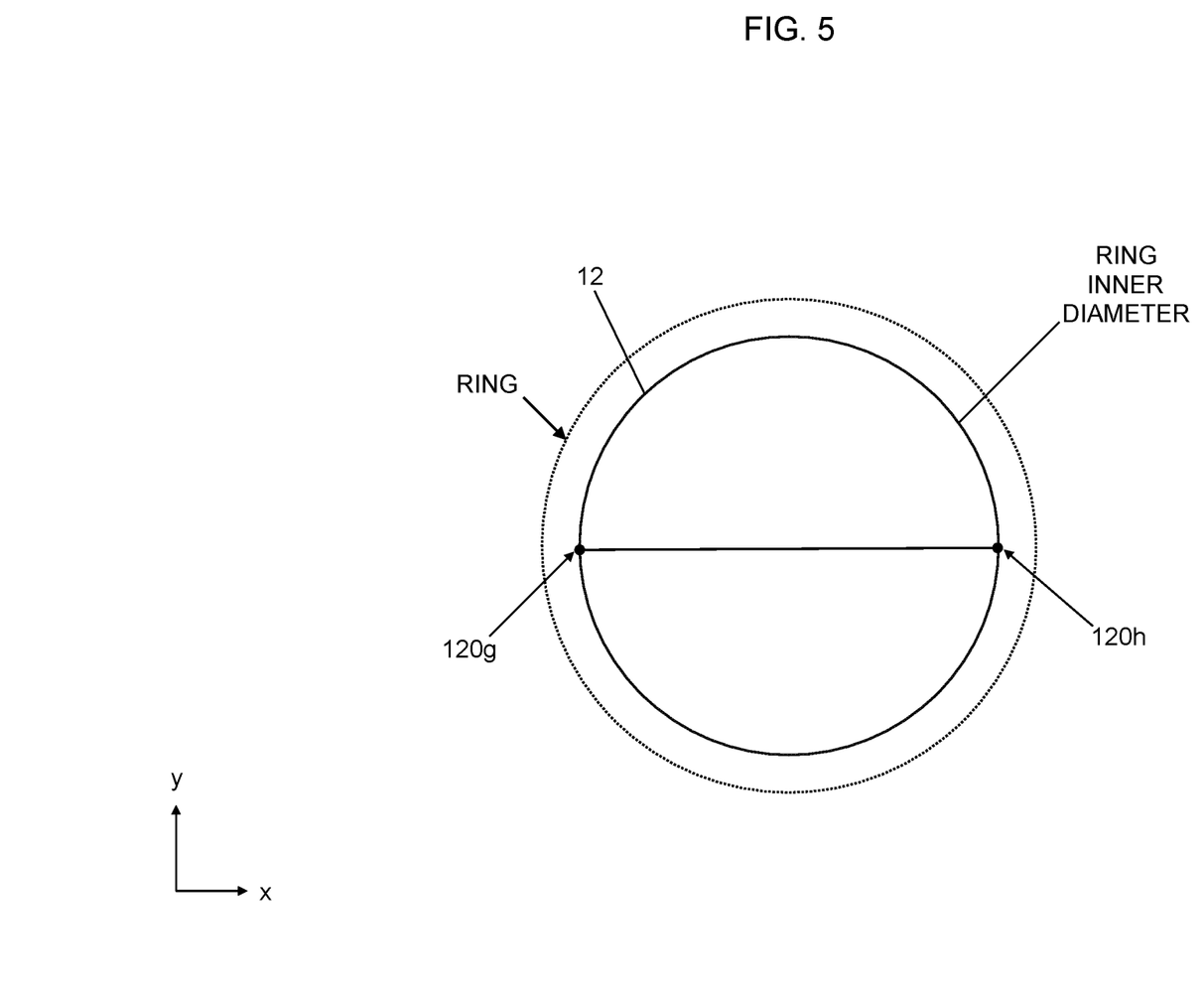
FIG. 5 illustrates an enlarged diagram of a calculated diameter of a selected finger using an identified dimension point pair from a digital image.
Figure 6:
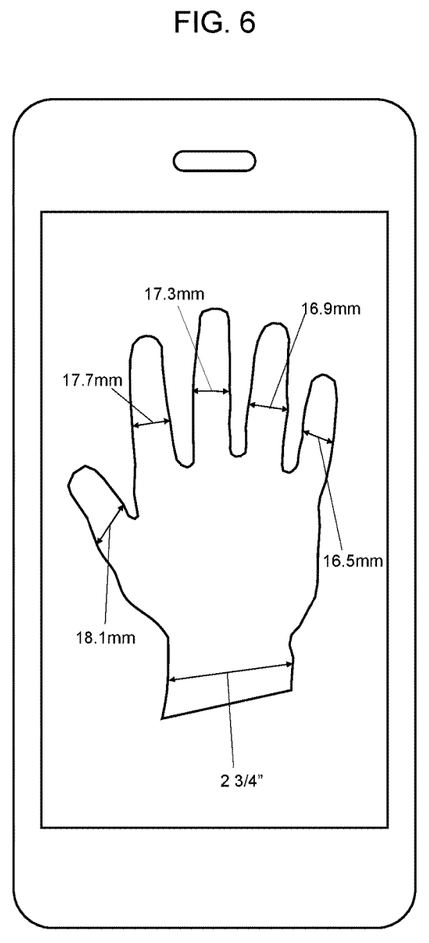
FIG. 6 illustrates the ring size measuring system displaying calculated measurements for each identified dimension point pair, superimposed over the users hand.

FIG. 4A illustrates a schematic front view of a users hand indicating dimension point pairs and FIG. 4B illustrates a schematic side view of the users hand illustrated in FIG. 4A indicating dimension point pairs.

The measuring system 100 identifies the plurality of dimension point pairs 120a-120b, 120c-120d, 120e-120f, 120g-120h, 120i-120j, 120k-120m for one or more of the user's fingers 12 and/or wrist area based on differences in pixels between the captured image and/or moving image and a background. As a result, the measuring system 100 is able to measure all required dimensions of a user's hand to calculate the users ring size, as well as watch size. For instance, in an exemplary embodiment, the dimension point pair 120g-120h may be used to determine an inner dimension of a desired ring 20. As the user rotates the measuring system 360 degrees around the users finger 12, the system 100 defines a first point 120g on the users finger and approximates a circumference of the finger 12 when defining a second point 120h, while being rotated. However, the present general inventive concept is not limited thereto. That is, the measuring system 100 may simply calculate a distance between the first point 120g and the second point 120h to determine a diameter of the users finger which is then used to determine the ring size of that finger, using a data set stored within the memory 106.

In alternative embodiments, the system 100 may further incorporate the use of augmented reality and/or virtual reality to calculate the size of the user's finger. In addition, the system 100 may be used to superimpose a 3-dimensional image of a desired ring on top of the image of the users hand to determine which ring to purchase. The system 100 includes an electronic device 110 having an image capturing device 102 and a plurality of processors 104 which execute instructions in custom software stored within memory 106.

The user captures an image of his/her hand using the device 110 and the one or more processors 104 measure and record position and orientation information of the device 110 with respect to the users hand 10. In addition, the processors determine the largest diameter for each finger based on the image of the users hand.

In exemplary embodiments, the system may 100 include an integrated image capturing device or may receive image data captured by an external image capturing device. However, the present general inventive concept is not limited thereto.

The network is configured to allow the system 100 to communicate with various devices including image capturing devices 102 in order to send/receive data including image data representing a user's hand to be measured. That is, the system 100 may be configured to calculate, determine, and output a user's ring size based on the data received from a plurality of image capturing devices 102 including a camera, a smartphone, a computer, a video camera, and a virtual reality headset. However, the present general inventive concept is not limited thereto.

That is, in alternative embodiments, the image capturing devices 102 include various other electronic devices for capturing moving and/or still images such as mobile phones, tablets, watches, and other computing devices configured to capture an image.

In the present embodiment, the system 100 may be configured to receive still images or moving images depicting the user's hand in order to calculate a ring size of a particular finger. In other words, the system 100 according to the present general inventive concept is configured to receive an image (moving or still) of the user's hand in order to determine a ring size for that user.

As such, the image processing system 100 according to the present inventive concept will be described in reference to determining a ring size of the user.

In the present embodiment, the image processing system 100 includes an electronic device 108 having a display screen 108a with a user interface 108b and a memory 106 coupled to one or more processors 108d. However, the present general inventive concept is not limited thereto. That is, in alternative embodiments, the image processing system 100 may be configured to receive image data depicting the user's hand from the image database 102 via the network 106 or an external database.

In the present embodiment, after receiving image data depicting the user's hand, the image processing system 100 determines a distance between the user's hand and the image capturing device 108. This distance may be determined by the image capturing device 108 and included within the image data so as to be accessible by the one or more processors 108d. Next, the one or more processors 108d calculates a circumference of one the user's fingers based on the received image data and distance between the image capturing device 108 and the user's hand.

Next, the image processing system 100 determines a ring size of the user's finger by using ring size conversion data stored within the memory 116 and the calculated circumference of the user's finger. For instance, a calculated circumference of 46.8 mm corresponds to a ring size of 4 in the United States and H ½ in UK.

Figure 8:
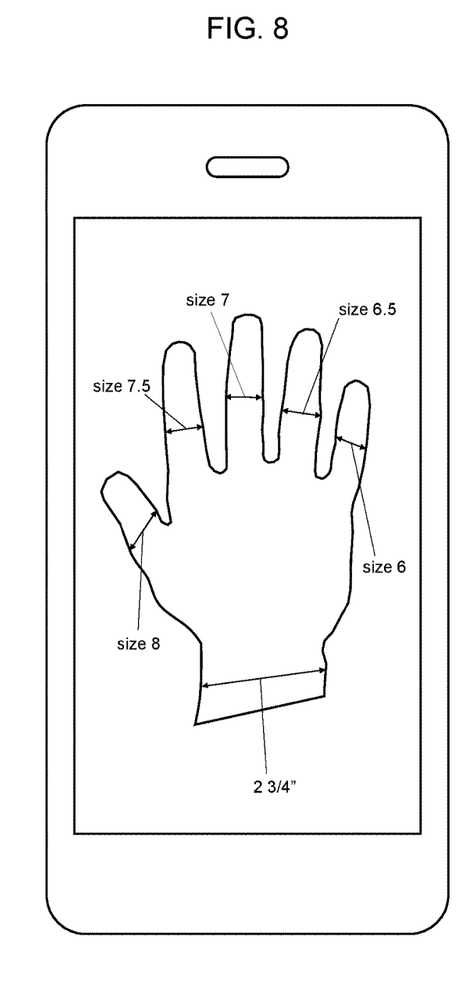
FIG. 8 illustrates the ring size measuring system displaying identified ring sizes for each identified dimension point pair superimposed over the users hand.
Figure 9:
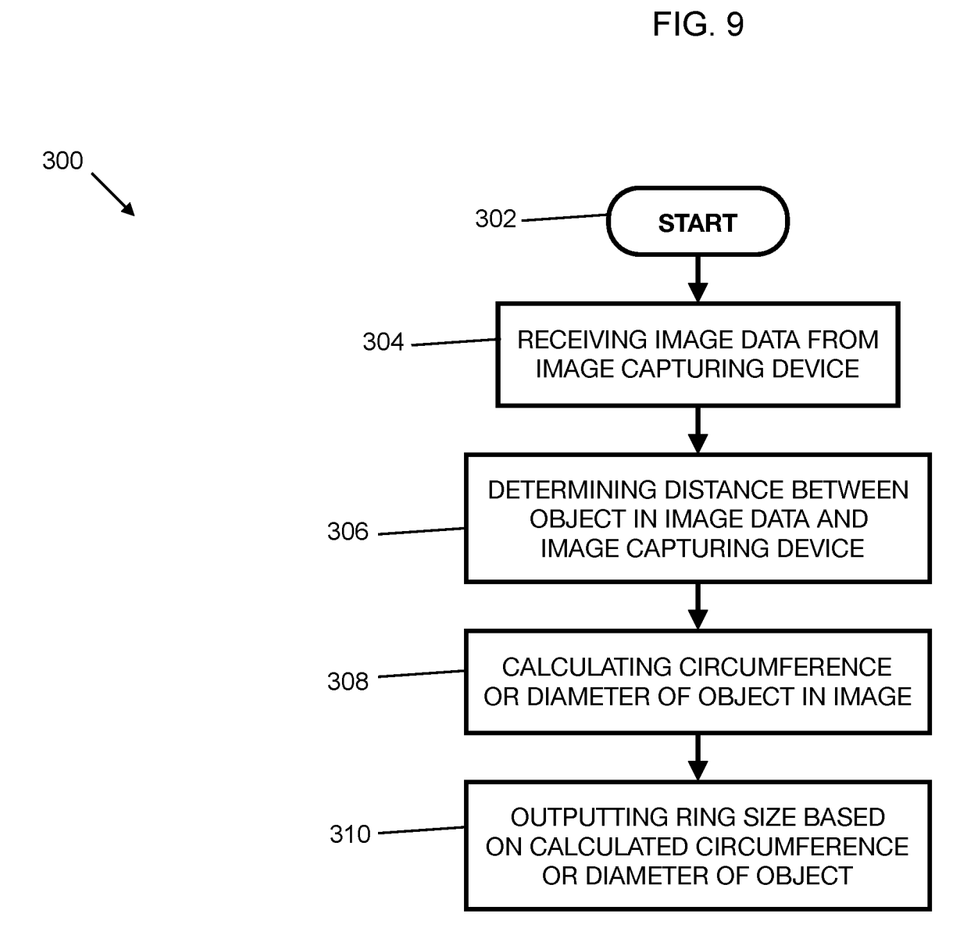
FIG. 9 illustrates a flow diagram of a method of determining a ring size of a user using the measuring system according to the present general inventive concept.

Next, the image processing system 100 displays the ring size of the user's finger on the display screen 112 of the display device 110.

In the present exemplary embodiment, the measuring system 100 configured to measure a ring size of a user's finger includes an image capturing device 108, one or more processors, memory, and one or more programs, wherein the one or more programs are stored in the memory and configured to be executed by the one or more processors, the one or more programs including instructions for receiving a profile image (digital image) of the user's finger using the image capturing device 108, determining a distance between the image capturing device 108 and the user and calculating a circumference of the user's finger.

In alternative embodiments, the measuring system 100 further includes a display screen configured to display a ring size corresponding to the calculated circumference. That is, the ring size measuring system 100 include one or more programs 106a configured to display a ring size corresponding to the calculated diameter using a data set, including a diameter to ring size conversion chart of the selected finger on a display screen which is stored within the memory 106.

In the present embodiment, the one or more processors calculate the circumference of the user's finger using a determined width of the user's finger from the profile image of the user's finger captured by the image capturing device 108. The profile image includes predominately a front view or a rear view, at least one side view, and/or a video of a complete rotation of the user's finger to be measured. However, the present general inventive concept is not limited thereto.

In exemplary embodiments, the one or more processors calculate the circumference of the user's finger by using the formula C=F*(Pi)*d, wherein C represents circumference, Pi equals 3.14159, and d represents a diameter of the user's finger.

In alternative embodiments, the profile image further includes a moving image of a complete rotation of the user's finger to be measured.

The present general inventive concept provides a system and method for determining a ring size of a user using a still and/or moving image obtained from an electronic device. In alternative embodiments, the system and method according to the present general inventive concept may be used to determine a wrist size of a user, a dimension from both front and back sides of a user hand, a necklace size, and an earring size.

An electronic device to capture a still and/or moving image of the users hand from a plurality of orientations with respect to the image capturing device. The system and method do not require physical measurements of the users hand to output a ring size. Instead, the system and method according to the present general inventive concept, accesses position information of the image capturing device from the user's hand, pixel information from within the captured image of the users hand, and an external database to determine and output a ring size of the user.

The present general inventive concept can also be embodied as computer-readable codes on a computer-readable medium. The computer-readable medium can include a computer-readable recording medium and a computer-readable transmission medium. The computer-readable recording medium is any data storage device that can store data as a program which can be thereafter read by a computer system. Examples of the computer-readable recording medium include read-only memory (ROM), random-access memory (RAM), CD-ROMs, DVDs, magnetic tapes, floppy disks, and optical data storage devices. The computer-readable recording medium can also be distributed over network coupled computer systems so that the computer-readable code is stored and executed in a distributed fashion. The computer-readable transmission medium can transmit carrier waves or signals (e.g., wired or wireless data transmission through the Internet).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description but is only limited by the scope of the appended claims.

Although a few exemplary embodiments of the present general inventive concept have been illustrated and described, it will be appreciated by those skilled in the art that changes may be made in these exemplary embodiments without departing from the principles and spirit of the general inventive concept, the scope of which is defined in the appended claims and their equivalents.

What is claimed is:

1. A ring size measuring system to digitally measure a ring size of a user's finger, the system comprising:
    an image capturing device configured to capture a digital image of the user's finger;
    one or more processors;
    memory; and
    one or more programs, wherein the one or more programs are stored in the memory and configured to be executed by the one or more processors, the one or more programs including instructions for:
    receiving a digital image of a user's hand using the image capturing device;
    determining a distance between the image capturing device and the user's hand; and
    defining at least one-dimension point pair of a selected finger from the received digital image,
    wherein the distance between the image capturing device and the user's hand is determined when the use adjusts a position of the user's hand to fall within a hand outline displayed on the image capturing device, and
    wherein the one or more processors use the determined distance between the image capturing device and the user's hand and a distance between the dimension point pair to calculate a diameter of the selected finger.

2. The ring size measuring system of claim 1, wherein the one or more programs further includes displaying a ring size corresponding to the calculated diameter using a data set including a diameter to ring size conversion chart of the selected finger on a display screen.

3. The ring size measuring system of claim 1, further comprising the one or more processors calculating a circumference of the selected finger based on the calculated diameter.

4. The ring size measuring system of claim 3, wherein the one or more programs further includes displaying a ring size corresponding to the calculated circumference using a data set including a circumference to ring size conversion chart of the selected finger on a display screen.

5. The ring size measuring system of claim 1, wherein the digital image includes a first orientation and a different second orientation of the user's hand.

6. The ring size measuring system of claim 3, wherein the calculating of the circumference includes the one or more processors using a formula C=(Pi)*d, wherein C represents circumference, Pi equals 3.14159, and d represents the diameter of the selected finger.

7. The ring size measuring system of claim 4, wherein the digital image is a moving image of a complete rotation of the user's finger.

8. The ring size measuring system of claim 1, further comprising an augmented reality system using the image of the user's hand captured using the image capturing device to determine a ring size of a selected finger.

9. The ring size measuring system of claim 1, further comprising a virtual reality system using the image of the user's hand captured using the image capturing device to determine a ring size of a selected finger.

10. A computer-implemented method for measuring a ring size of a user's finger, the method comprising:
    capturing image data comprising a plurality of views of a user's hand having at least two or more different orientations;
    calibrating measurement information by positioning the user's hand within an overlayed image of a hand outline;
    defining at least one-dimension point pair of a desired finger from the captured image data;
    calculating a diameter based on a distance between the defined dimension points; and
    determining a ring size of the desired finger based on the calibrated measurement information and the calculated diameter using a data set.

11. The method of claim 10, wherein the dimension point pair is defined at outermost edges of the desired finger.

12. The method of claim 11, further comprising calculating a circumference of the desired finger using the dimension point pair captured from the two or more different orientations.

13. The method of claim 10, wherein the data set includes circumference data, diameter data, and corresponding ring size data.

\* \* \* \* \*